(12) United States Patent
Bovik et al.

(10) Patent No.: US 9,277,148 B2
(45) Date of Patent: Mar. 1, 2016

(54) MAXIMIZING PERCEPTUAL QUALITY AND NATURALNESS OF CAPTURED IMAGES

(71) Applicant: Board of Regents, The University of Texas System, Austin, TX (US)

(72) Inventors: Alan Bovik, Austin, TX (US); Anush Moorthy, San Diego, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/404,969

(22) PCT Filed: Jun. 3, 2013

(86) PCT No.: PCT/US2013/043881
§ 371 (c)(1),
(2) Date: Dec. 2, 2014

(87) PCT Pub. No.: WO2013/184571
PCT Pub. Date: Dec. 12, 2013

(65) Prior Publication Data
US 2015/0116548 A1    Apr. 30, 2015

Related U.S. Application Data

(60) Provisional application No. 61/656,075, filed on Jun. 6, 2012.

(51) Int. Cl.
*H04N 5/235* (2006.01)
*H04N 5/357* (2011.01)
(Continued)

(52) U.S. Cl.
CPC .......... *H04N 5/3572* (2013.01); *G06K 9/00697* (2013.01); *G06K 9/036* (2013.01);
(Continued)

(58) Field of Classification Search
CPC .................................................. H04N 5/23222
USPC .............................................. 348/241, 229.1
See application file for complete search history.

(56) References Cited

U.S. PATENT DOCUMENTS

| 6,301,440 B1 | 10/2001 | Bolle et al. |
| 2004/0252217 A1 | 12/2004 | Battles et al. |

(Continued)

FOREIGN PATENT DOCUMENTS

JP    2011024726    * 2/2011

OTHER PUBLICATIONS

Mittal et al., "No-Reference Image Quality Assessment in the Spatial Domain," IEEE Transactions on Image Processing, vol. 221, No. 12, Dec. 2012, pp. 4695-4708.
(Continued)

*Primary Examiner* — Joel Fosselman
(74) *Attorney, Agent, or Firm* — Robert A. Voigt, Jr.; Winstead, P.C.

(57) ABSTRACT

A method, system and computer program product for improving the perceptual quality and naturalness of an image captured by an image acquisition device (e.g., digital camera). Statistical features of a scene being imaged by the image acquisition device are derived from models of natural images. These statistical features are measured and mapped onto the control parameters (e.g., exposure, ISO) of the digital acquisition device. By mapping these statistical features onto the control parameters, the perceptual quality and naturalness of the scene being imaged may be based on the values of these control parameters. As a result, these control parameters are modified to maximize the perceptual quality and naturalness of the scene being imaged. After modification of these control parameters, the image is captured by the image acquisition device. In this manner, the perceptual quality and naturalness of the image captured by the image acquisition device is improved.

21 Claims, 4 Drawing Sheets

(51) Int. Cl.
   *G06K 9/03* (2006.01)
   *G06T 7/00* (2006.01)
   *H04N 5/232* (2006.01)
   *G06K 9/00* (2006.01)

(52) U.S. Cl.
   CPC ......... *G06T 7/0002* (2013.01); *H04N 5/23222* (2013.01); *G06T 2207/20076* (2013.01); *G06T 2207/30168* (2013.01)

(56) References Cited

U.S. PATENT DOCUMENTS

2009/0185050 A1 7/2009 Chung et al.
2011/0274361 A1 11/2011 Bovik et al.

OTHER PUBLICATIONS

Moorthy et al., "Perceptually Optimized Blind Repair of Natural Images," Signal Processing: Image Communication, vol. 28, Issue 10, Nov. 2013, pp. 1478-1493.

Mittal et al., "Blind/Referenceless Image Spatial Quality Evaluator," Signals, Systems and Computers, 2011 Conference Record of the Forty Fifth Asilomar Conference on, IEEE, Nov. 6, 2011, pp. 723-727.

International Search Report and Written Opinion for International Application No. PCT/US20131043881 dated Sep. 25, 2013, pp. 1-11.

\* cited by examiner

MAXIMIZING PERCEPTUAL QUALITY AND NATURALNESS OF CAPTURED IMAGES

CROSS REFERENCE TO RELATED APPLICATIONS

This application claims priority to U.S. Provisional Patent Application Ser. No. 61/656,075, "Maximizing Perceptual Quality and Naturalness of Captured Images," filed on Jun. 6, 2012, which is incorporated by reference herein in its entirety.

GOVERNMENT INTERESTS

The U.S. Government has certain rights in this invention pursuant to the terms of National Science Foundation Grant No. 1116656.

TECHNICAL FIELD

The present invention relates generally to image acquisition devices, and more particularly to improving the perceptual quality and naturalness of the images captured by an image acquisition device (e.g., digital camera)

BACKGROUND

Currently, image acquisition devices, such as digital cameras, may require manual tuning of at least some of the camera control parameters (e.g., exposure (total amount of light allowed to fall on the image sensor); gain (contrast); and ISO (International Standards Organization) (measure of the sensitivity of the image sensor)) that control the capturing of images and the perceptual quality or naturalness of these captured images. The naturalness of an image refers to how the image is viewed when captured with little or minimal distortion. As a result, image acquisition devices seek to capture an image that is most similar to the image being viewed by the user in the physical world and/or an image that has the highest perceptual/visual quality.

Unfortunately, image acquisition devices, such as digital cameras, are limited in their ability to maximize the perceptual quality or naturalness of the captured images due to the fact that the camera parameters that are used to control the perceptual quality or naturalness of the captured image may require manual tuning by the users. Furthermore, digital cameras are limited in their ability to maximize the perceptual quality or naturalness of the captured images due to the limited number of parameters that are currently used to control image capture as well as the fact that almost all of these parameters have to be optimized manually based on a tuning engineer's perception of quality.

BRIEF SUMMARY

In one embodiment of the present invention, a method for improving a perceptual quality and naturalness of an image captured by an image acquisition device comprises detecting a scene being imaged. The method further comprises deriving statistical features of the scene being imaged from a model of natural images. Furthermore, the method comprises measuring the statistical features from the scene being imaged. Additionally, the method comprises mapping the statistical features onto one or more control parameters of the image acquisition device. In addition, the method comprises modifying, by a processor, the one or more control parameters of the image acquisition device to maximize the perceptual quality and naturalness of the scene being imaged.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for improving the perceptual quality and naturalness of an image captured by an image acquisition device (e.g., digital camera). In one embodiment of the present invention, statistical features of a scene being imaged by the image acquisition device are derived from models of natural images. These statistical features are measured and mapped onto the control parameters (e.g., exposure, gain, ISO) of the digital acquisition device. By mapping these statistical features onto the control parameters of the image acquisition device, the perceptual quality and naturalness of the scene being imaged may be based on the values of these control parameters. As a result, these control parameters are modified to maximize the perceptual quality and naturalness of the scene being imaged. After modification of these control parameters, the image is captured by the image acquisition device. In this manner, the perceptual quality and naturalness of the image captured by the image acquisition device is improved.

While the following discusses the present invention in connection with digital cameras, the principles of the present invention may be applied to any type of image acquisition device, such as, a radiographic system, a lung x-ray system, a digital camera on a mobile device, a mammogram, medical imaging modalities using ultrasound, magnetic resonance imaging, positron emission tomography, an imaging system coupled with a digital camera, such as a light microscope, etc. Embodiments covering such permutations would fall within the scope of the present invention.

Furthermore, while the following discusses the present invention in connection with automated camera control, the principles of the present invention may be applied to image repair of damaged images. Embodiments covering such permutations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
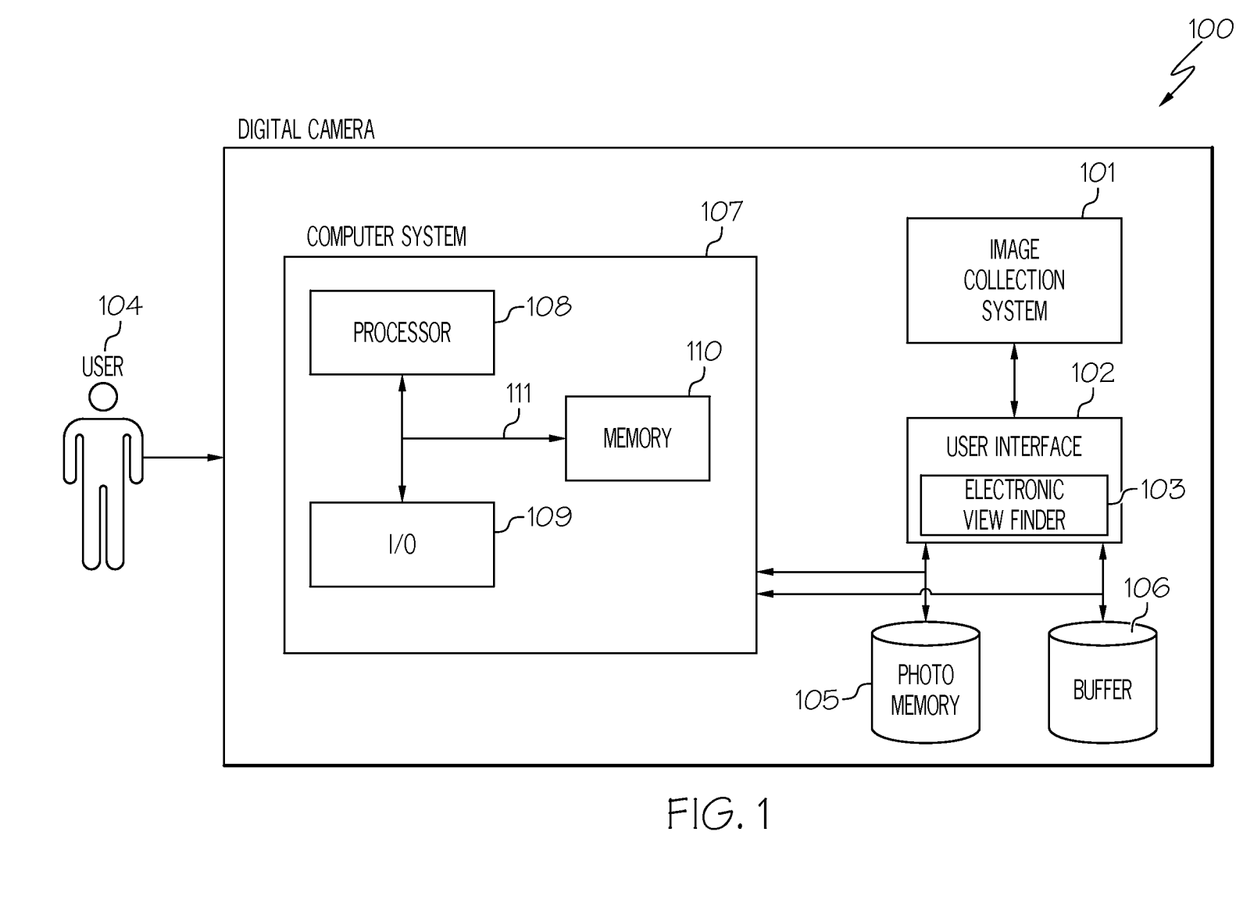
FIG. 1 illustrates a digital camera configured in accordance with an embodiment of the present invention.

Referring now to the Figures in detail, FIG. 1 illustrates a digital camera 100 for practicing the principles of the present invention in accordance with an embodiment of the present invention. Digital camera 100 may generally include any number of features commonly found on such current art devices, including those incorporated into phones and other hand held devices. Among such features is an image collection system 101, e.g., a lens/electronic sensor for converting physical image data into electronic image data (i.e., an "image"). Also included is a user interface 102, which generally comprises an electronic view finder 103 that provides a live preview for displaying real time electronic image data. Electronic view finder 103 allows a user 104 to view and "frame" a picture prior to actually taking the picture. User interface 102 may also include other features, such as touch screen capabilities, a picture capture button, informational displays, manual buttons and controls, zooming features, autofocus, menu selections, etc. In general, operation of digital camera 100 involves user 104 pointing the digital camera lens at some physical image data, which then appears as a live preview on electronic view finder 103. When the image is framed in an acceptable manner, user 104 snaps the picture by depressing a picture capture button, which stores an electronic image of the picture in a photo memory 105.

Digital camera 100 may further include a buffer 106 used to store the image that is displayed to user 104 on electronic view finder 103 prior to the image being captured by digital camera 100. That is, while the image is being framed by user 104, such an image may be stored in buffer 106 prior to the image being captured. While the image is buffered in buffer 106, control parameters of digital camera 100 (e.g., exposure, gain, ISO, white balance, color saturation, contrast, sharpness, etc.) may be modified to maximize the perceptual quality and naturalness of the image being framed using the principles of the present invention as discussed further below. Once the camera parameters have been modified to maximize the perceptual quality and naturalness of the image being framed, the image may then be captured and stored in photo memory 105.

In one embodiment, digital camera 100 includes a computer system 107 for maximizing the perceptual quality and naturalness of the image captured by digital camera 100. Such a computing device 107 generally includes a processor 108, an input/output (I/O 109), a memory 110, and a bus 111. Processor 108 may comprise a single processing unit, or be distributed across one or more processing units. Memory 110 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 109 may comprise any system for exchanging information to/from an external resource. External devices/resources may comprise any known type of external device, including a monitor/display, speakers, storage, another computer system, a hand-held device, keyboard, voice recognition system, speech output system, etc. Bus 111 provides a communication link between each of the components in the computing device 107 and likewise may comprise any known type of transmission link, including electrical, optical, wireless, etc. Although not shown, additional components, such as cache memory, communication systems, system software, etc., may be incorporated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, image acquisition devices, such as digital cameras, may require manual tuning of almost all of the camera control parameters (e.g., exposure (total amount of light allowed to fall on the image sensor); gain (modulate the response of the image sensor); ISO (International Standards Organization) (measure the sensitivity of the image sensor); sharpness (measure the local edge strength); color saturation (measure of colorfulness); contrast (measure of how "washed-out" an image is); white balance (model of ambient light on scene being imaged); and focus (measure of lens position which controls sharpness of the image)) that control the capturing of images and the perceptual quality or naturalness of these captured images. The naturalness of an image refers to how the image is viewed when captured with little or minimal distortion. As a result, image acquisition devices seek to capture an image that is most similar to the image being viewed by the user in the physical world and/or an image that has the highest perceptual/visual quality. Unfortunately, image acquisition devices, such as digital cameras, are limited in their ability to maximize the perceptual quality or naturalness of the captured images due to the fact that the camera parameters that are used to control the perceptual quality or naturalness of the captured image may require manual tuning by the users. Furthermore, digital cameras are limited in their ability to maximize the perceptual quality or naturalness of the captured images due to the limited number of parameters that are currently used to control image capture as well as the fact that almost all of these parameters have to be optimized manually based on a tuning engineer's perception of quality.

Figure 2:
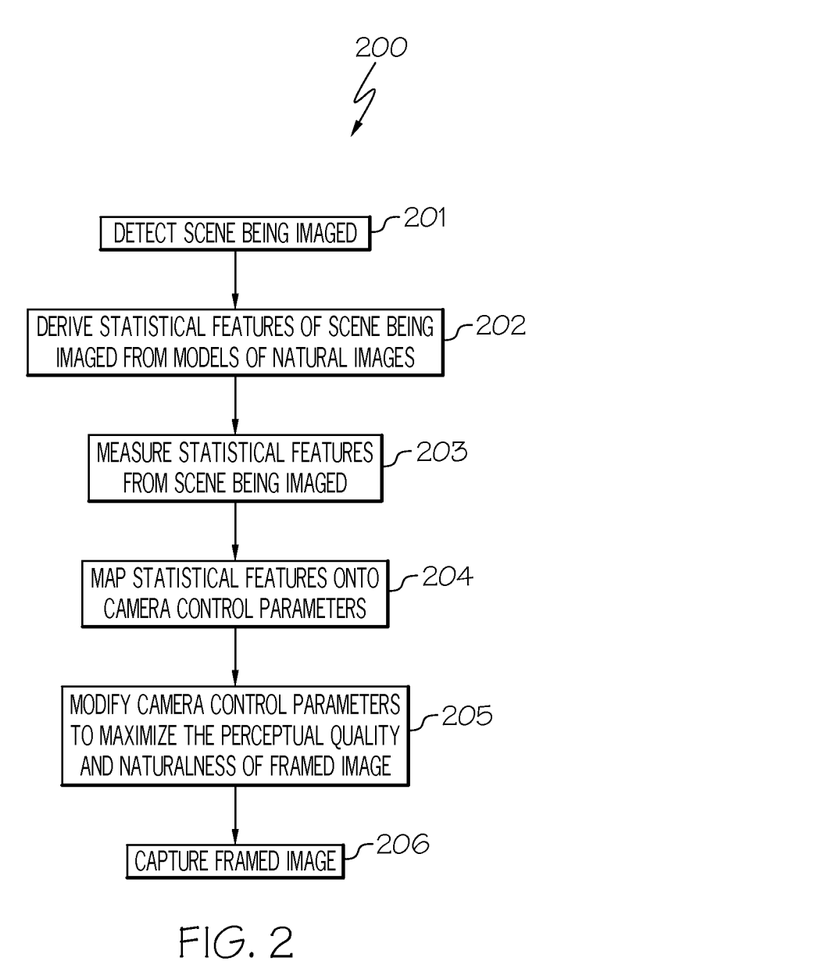
FIG. 2 is a flowchart of a method for maximizing the perceptual quality and naturalness of images captured by an image acquisition device in accordance with an embodiment of the present invention.
Figure 3:
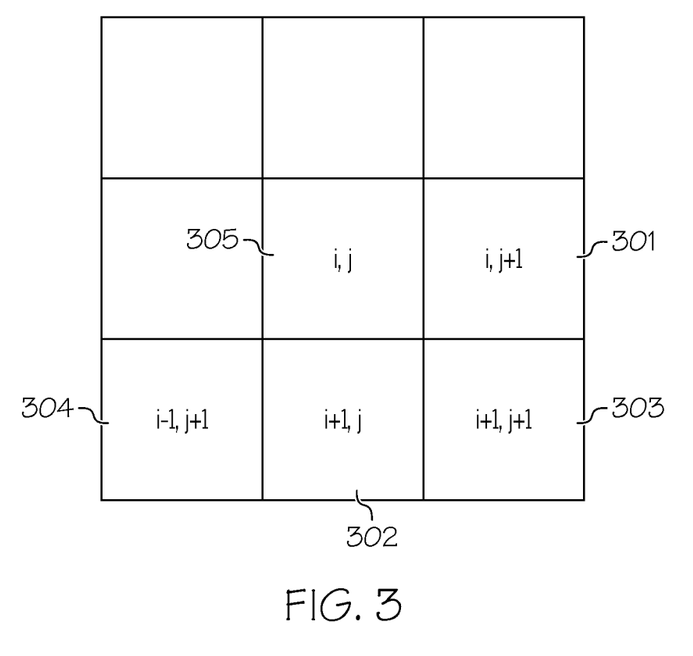
FIG. 3 illustrates the various paired products computed in order to quantify neighboring statistical relationships in accordance with an embodiment of the present invention.
Figure 4:
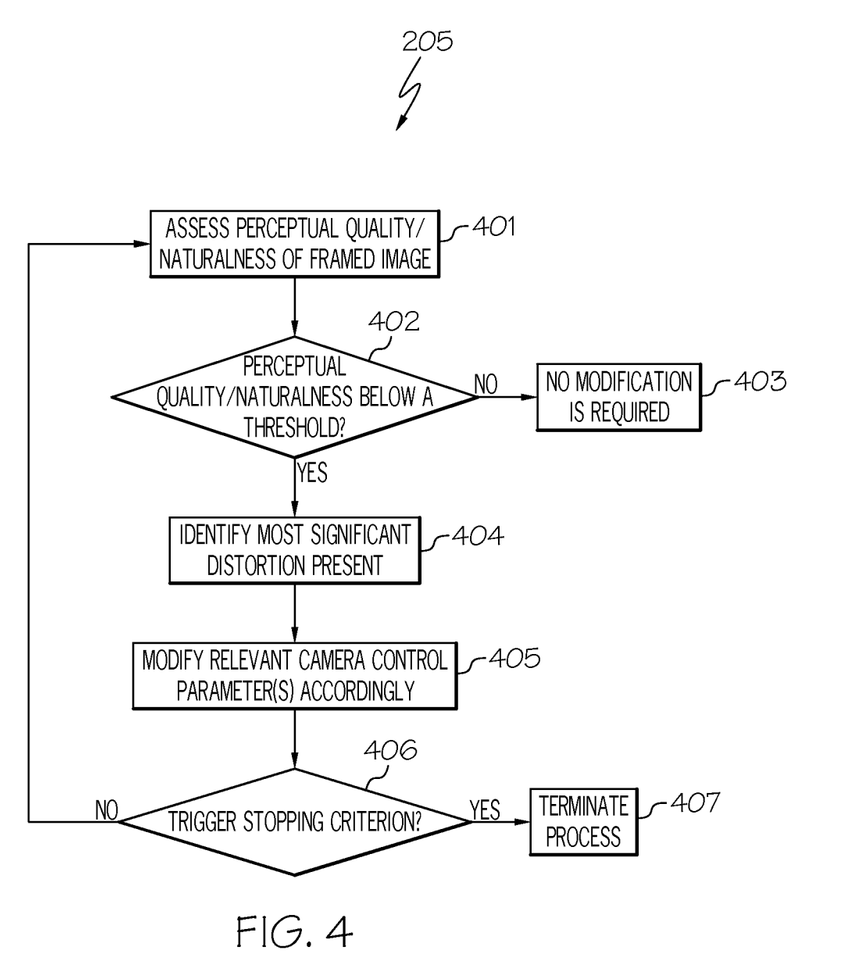
FIG. 4 is a flowchart of the sub-steps for modifying camera parameters to maximize the perceptual quality and naturalness of the framed image in accordance with an embodiment of the present invention.

The principles of the present invention provide a means for maximizing the perceptual quality and naturalness of the images captured by the image acquisition device (e.g., digital camera) as discussed further below in connection with FIGS. 2-4. FIG. 2 is a flowchart of a method for maximizing the perceptual quality and naturalness of the images captured by the image acquisition device. FIG. 3 illustrates the various paired products computed in order to quantify neighboring statistical relationships. FIG. 4 is a flowchart of the sub-steps for modifying camera control parameters to maximize the perceptual quality and naturalness of the framed image.

Referring now to FIG. 2, FIG. 2 is a flowchart of a method 200 for maximizing the perceptual quality and naturalness of the images captured by the image acquisition device, such as digital camera 100 (FIG. 1) in accordance with an embodiment of the present invention. While the following discusses method 200 in connection with maximizing the perceptual quality and naturalness of the images captured by camera 100, the principles of the present invention may apply to any image acquisition device, such as a radiographic system, a lung x-ray system, a mammogram, medical imaging modalities using ultrasound, magnetic resonance imaging, positron emission tomography, an imaging system coupled with a digital camera, such as a light microscope, etc.

Referring to FIG. 2, in conjunction with FIG. 1, in step 201, digital camera 100 detects a scene being imaged in electronic view finder 103. In one embodiment, such an image is said to be "framed" and stored in buffer 106. While the framed image is stored in buffer 106, the image may be analyzed for distortions based on natural statistical image models whose distortions are repaired or corrected by modifying the camera parameters (e.g., exposure, gain, ISO) so as to maximize the perceptual quality and naturalness of the image that will be captured by digital camera 100 as discussed further below.

In step 202, digital camera 100 derives the statistical features of the scene being imaged from models of natural images (i.e., from natural statistical image models). In one embodiment, a no-reference image quality assessment is performed in the spatial domain as discussed further below. While the following discusses the model being expressed in the spatial domain, it may be expressed in other transform domains, such as the wavelet domain or the discrete cosine transform domain. Prior to discussing the no-reference image quality assessment process, a brief discussion of the basis of such an approach is deemed appropriate.

The approach to no-reference image quality assessment is based on the principle that natural images possess certain regular statistical properties that are measurably modified by the presence of distortions. Deviations from the regularity of natural statistics, when quantified appropriately, enable algorithms capable of assessing the perceptual quality of an image without the need for any reference image. By quantifying natural image statistics and refraining from an explicit characterization of distortions, the no-reference image quality assessment approach is not limited by the type of distortions that afflict the image.

The no-reference image quality assessment approach uses the Blind/Referenceless Image Spatial QUality Evaluator (BRISQUE) which utilizes a natural scene statistic model-based framework of locally normalized luminance coefficients and quantifies "naturalness" using the parameters of the model. BRISQUE introduces a model of the statistics of pair-wise products of neighboring (locally normalized) luminance values. The parameters of this model further quantify the naturalness of the image. Characterizing locally normalized luminance coefficients in this way is sufficient not only to quantify naturalness, but also to quantify quality in the presence of distortion.

The details of the statistical model of locally normalized luminance coefficients in the spatial domain as well as the model for pairwise products of these coefficients will be discussed further below. Furthermore, the statistical features that are extracted from the model are discussed further below.

The spatial approach to no-reference image quality assessment can be summarized as follows. Given a (possibly distorted) image, first compute locally normalized luminances via local mean subtraction and divisive normalization. It has been observed that applying a local non-linear operation to log-contrast luminances to remove local mean displacements from zero log-contrast and to normalize the local variance of the log contrast has a decorrelating effect. Such an operation may be applied to a given intensity image I(i,j) to produce:

$$\hat{I}(i, j) = \frac{I(i, j) - \mu(i, j)}{\sigma(i, j) + C} \quad (EQ\ 1)$$

where, $i \approx 1, 2 \ldots M$, $j \approx 1, 2 \ldots N$ are spatial indices, M, N are the image height and width respectively, C=1 is a constant that prevents instabilities from occurring when the denominator tends to zero (e.g., in the case of an image patch corresponding to the plain sky) and $$\mu(i, j) = \sum_{k=-K}^{K} \sum_{l=-L}^{L} w_{k,l} I_{k,l}(i, j) \quad (EQ\ 2)$$

$$\sigma(i, j) = \sqrt{\sum_{k=-K}^{K} \sum_{l=-L}^{L} w_{k,l}(I_{k,l}(i, j) - \mu(i, j))^2} \quad (EQ\ 3)$$

where $\omega = \{\omega_{k,l} | k=-K, \ldots, K, l=-L, \ldots, L\}$ is a 2D linear weighting function (such as a circularly-symmetric Gaussian weighting function that is spatially truncated and rescaled to unit volume). In one embodiment, $\omega$ is Gaussian with K=L=3.

It has been observed that these normalized luminance values (EQ 1) of natural images strongly tend towards a unit normal Gaussian probabilistic characteristic. Such an operation can be used to model the decorrelation and contrast-gain masking processes in early human vision. The pre-processing model (EQ 1) is utilized in the quality assessment model development and refer to the transformed luminances I(i,j) as Mean Subtracted Contrast Normalized (MSCN) coefficients. A histogram of MSCN coefficients for a natural undistorted image appears Gaussian-like where the Gaussian-like appearance becomes modified for various distorted versions of the image. For example, blur creates a more Laplacian appearance, while white-noise distortion appears to reduce the weight of the tail of the histogram. Furthermore, there is high correlation between surrounding pixels because images functions are piecewise smooth followed by edge discontinuities. However, normalization procedures greatly reduce dependencies between neighboring coefficients.

It is hypothesized that the MSCN coefficients have characteristic statistical properties that are changed by the presence of distortion, and that quantifying these changes (i.e., measuring statistical features from the scene being imaged) will make it possible to predict the type of distortion affecting an image as well as its perceptual quality.

The statistical relationships between neighboring pixels are also modeled. While MSCN coefficients are definitely more homogenous for pristine images, the signs of adjacent coefficients also exhibit a regular structure. This structure gets disturbed in the presence of distortion. This structure is modeled using distribution of pairwise products of neighboring MSCN coefficients along four orientations—horizontal (H), vertical (V), main-diagonal (D1) and secondary-diagonal (D2), as illustrated in FIG. 3. FIG. 3 illustrates the various paired products computed in order to quantify neighboring statistical relationships in accordance with an embodiment of the present invention. Referring to FIG. 3, pairwise products are computed along four orientations—horizontal 301, vertical 302, main-diagonal 303 and secondary-diagonal 304 at a distance of 1 pixel with respect to the central pixel 305. Specifically, $$H(i,j) = \hat{I}(i,j)\hat{I}(i,j+1) \quad (EQ\ 4)$$

$$V(i,j) = \hat{I}(i,j)\hat{I}(i+1,j) \quad (EQ\ 5)$$

$$D1(i,j) = \hat{I}(i,j)\hat{I}(i+1,j+1) \quad (EQ\ 6)$$

$$D2(i,j) = \hat{I}(i,j)\hat{I}(i+1,j-1) \quad (EQ\ 7)$$

for $i \in \{1, 2 \ldots M\}$ and $j \in \{1, 2 \ldots N\}$.

Under the Gaussian coefficient model, and assuming the MSCN coefficients are zero mean and unit variance, these products resemble the following distribution in the absence of distortion:

$$f(a, \sigma, \rho) = \frac{\exp\left(\frac{|a|\rho}{1-\rho^2}\right) K_0\left(\frac{|a|}{1-\rho^2}\right)}{\pi \sqrt{(1-\rho^2)}} \quad (EQ\ 8)$$

where f is an asymmetric probability density function, $\rho$ denotes the correlation coefficient of adjacent coefficients, and $K_0$ is the modified Bessel function of the second kind. While the density function is a good model for the empirical histograms products of adjacent normalized coefficients, it has only a single parameter, and as such, may not provide a good fit to the empirical histograms of coefficient products from distorted images. Further, it is not finite at the origin and therefore does not provide a good fit to discrete normalized luminance data for any image. As a result, a very general model Asymmetric Generalized Gaussian Distributions (AGGD) may be adopted.

To be clear, the pairwise products of neighboring MSCN coefficients do not have a Gaussian distribution. These have a symmetric distribution that resemble the ideal equation (EQ 8) if not distorted, but are typically asymmetric and do not resemble equation (EQ 8) if distorted. The Asymmetric Generalized Gaussian Distribution (AGGD) is used to test these conditions as an approximation to both the symmetric case equation (EQ 8) for undistorted and to the distorted case of asymmetry.

In another embodiment, the statistical features of the scene being imaged from models of natural images are derived by identifying distortion categories for the image, where the quality of the image is determined based on these distortion categories using BRISQUE. The quality of the image may also be determined based on these distortion categories as discussed in U.S. Patent Application Publication No. 2011/0274361, which is hereby incorporated herein in its entirety.

Referring to FIG. 2, in conjunction with FIG. 1, in step 203, digital camera 100 measures the statistical features from the scene being imaged. For example, in step 203, digital camera 100 uses scene statistics of locally normalized luminance coefficients to quantify possible losses of naturalness in the image due to the presence of distortions as discussed above in connection with the BRISQUE approach.

In step 204, digital camera 100 maps the statistical features onto the control parameters (e.g., exposure, gain, ISO) of digital camera 100. For example, by mapping the statistical features onto the control parameters of digital camera 100, the variation of the perceptual quality and naturalness of the framed image based on the values of the particular control parameter (e.g., ISO) in question may be expressed, such as in a generalized Gaussian function. In this manner, the appropriate value for that control parameter may be selected that maximizes the perceptual quality and naturalness of the framed image. That is, the variations in the control parameters are observed to change the perceptual quality and naturalness of the scene being imaged, where the variations are measured against a statistical natural scene model. As a result, a value for a control parameter may be modified to correspond to a best fit of the statistical features of the image to the statistical natural scene model which corresponds to a maximum perceptual quality and naturalness of the scene being imaged.

In step 205, digital camera 100 modifies the camera control parameters to maximize the perceptual quality and naturalness of the framed image. For example, as discussed above, the variation of the perceptual quality and naturalness of the framed image based on the values of the particular control parameter (e.g., ISO) in question may be expressed as a Gaussian function. As a result, the value of the control parameter that corresponds to the peak of the curve of the Gaussian function may be selected as it corresponds to the maximum perceptual quality and naturalness of the framed image for that particular control parameter.

A detailed description of the sub-steps of step 205 for modifying the camera control parameters to maximize the perceptual quality and naturalness of the image are discussed below in connection with FIG. 4.

Referring to FIG. 4, in conjunction with FIGS. 1 and 2, in step 401, digital camera 100 assesses the perceptual quality/naturalness of the framed image (referring to the image that is currently being stored in buffer 106), such as using the BRISQUE approach as discussed above.

In step 402, a determination is made by digital camera 100 as to whether the perceptual quality/naturalness of the framed image is below a threshold. If the perceptual quality/naturalness of the framed image is not below a threshold, then, in step 403, digital camera 100 does not provide any modification to the framed image.

If, however, the quality/naturalness of the framed image is below a threshold, then, in step 404, digital camera 100 identifies the most significant distortion present in the framed image (e.g., significant blur at the bottom right hand of the framed image being displayed on electronic view finder 103).

In step 405, digital camera 100 modifies the relevant control parameter(s) accordingly that caused the distortion identified in step 404. For example, the control parameters of ISO and exposure may have caused a loss of quality, such as poor contrast or poor color reproduction of the framed image and therefore will be adjusted so that the values of these control parameters correspond to the maximum perceptual quality and naturalness of the framed image using a Gaussian function as discussed above in connection with step 205. In this manner, by modifying the camera control parameters to maximize the perceptual quality and naturalness of the framed image, the perceptual quality and naturalness of the image to be captured by digital camera 100 will be improved.

In step 406, a determination is made by digital camera 100 as to whether a stopping criterion is triggered. For example, digital camera 100 may perform the sub-steps of step 205 for a limited number of iterations (i.e., a threshold number of iterations, where the threshold may be based on the level of acceptable quality, where the quality may be computed using an algorithm, such as BRISQUE). After reaching the threshold number of iterations, it may be deemed that the image is too distorted to be corrected.

If a stopping criterion has been triggered, then, in step 407, the process is terminated.

If, however, the stopping criterion has not been triggered, then digital camera 100 reassesses the perceptual quality/naturalness of the framed image in step 401 after modification of the camera control parameter(s).

Returning to FIG. 2, in conjunction with FIG. 1, in step 206, digital camera 100 captures the framed image after the camera control parameter(s) have been modified (if necessary) and the perceptual quality/naturalness of the framed image exceeds a threshold level of quality/naturalness. The captured image is then stored in photo memory 105.

In some implementations, method 200 may include other and/or additional steps that, for clarity, are not depicted. Further, in some implementations, method 200 may be executed in a different order presented and that the order presented in the discussion of FIGS. 2 and 4 is illustrative. Additionally, in some implementations, certain steps in method 200 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving a perceptual quality and naturalness of an image captured by an image acquisition device, the method comprising:
   detecting a scene being imaged;
   deriving statistical features of locally normalized luminance coefficients from said scene being imaged from a model of natural images with little or minimal distortion;
   measuring said statistical features from said scene being imaged;
   mapping said statistical features onto one or more control parameters of said image acquisition device; and
   modifying, by a processor, said one or more control parameters of said image acquisition device to maximize said perceptual quality and naturalness of said scene being imaged.

2. The method as recited in claim 1 further comprising:
   capturing said scene being imaged after said modification of said one or more control parameters of said image acquisition device.

3. The method as recited in claim 1 further comprising:
   assessing said perceptual quality and naturalness of said scene being imaged.

4. The method as recited in claim 3 further comprising:
   identifying a most significant distortion present in said scene being imaged in response to said assessed perceptual quality and naturalness of said scene being imaged being below a threshold; and modifying one or more control parameters that caused said identified most significant distortion present in said scene being imaged in response to said assessed perceptual quality and naturalness of said scene being imaged being below said threshold.

5. The method as recited in claim 1, wherein variations in said perceptual quality and naturalness of said scene being imaged change with one of said one or more control parameters, wherein said variations are measured against a statistical natural scene model, wherein a value of said one of said one or more control parameters is modified to correspond to a best fit of said statistical features of said scene being imaged to said statistical natural scene model which corresponds to a maximum perceptual quality and naturalness of said scene being imaged.

6. The method as recited in claim 1, wherein said image acquisition device comprises one of the following: a digital camera and an imaging system coupled with a digital camera.

7. The method as recited in claim 1, wherein said image acquisition device comprises one of the following: an x-ray system, a radiographic system, medical imaging modalities using ultrasound, magnetic resonance imaging and positron emission tomography.

8. A computer program product embodied in a non-transitory computer readable storage medium for improving a perceptual quality and naturalness of an image captured by an image acquisition device, the computer program product comprising the programming instructions for:
   detecting a scene being imaged;
   deriving statistical features of locally normalized luminance coefficients from said scene being imaged from a model of natural images with little or minimal distortion;
   measuring said statistical features from said scene being imaged;
   mapping said statistical features onto one or more control parameters of said image acquisition device; and
   modifying said one or more control parameters of said image acquisition device to maximize said perceptual quality and naturalness of said scene being imaged.

9. The computer program product as recited in claim 8 further comprising the programming instructions for:
   capturing said scene being imaged after said modification of said one or more control parameters of said image acquisition device.

10. The computer program product as recited in claim 8 further comprising the programming instructions for:
    assessing said perceptual quality and naturalness of said scene being imaged.

11. The computer program product as recited in claim 10 further comprising the programming instructions for:
    identifying a most significant distortion present in said scene being imaged in response to said assessed perceptual quality and naturalness of said scene being imaged being below a threshold; and
    modifying one or more control parameters that caused said identified most significant distortion present in said scene being imaged in response to said assessed perceptual quality and naturalness of said scene being imaged being below said threshold.

12. The computer program product as recited in claim 8, wherein variations in said perceptual quality and naturalness of said scene being imaged change with one of said one or more control parameters, wherein said variations are measured against a statistical natural scene model, wherein a value of said one of said one or more control parameters is modified to correspond to a best fit of said statistical features of said scene being imaged to said statistical natural scene model which corresponds to a maximum perceptual quality and naturalness of said scene being imaged.

13. The computer program product as recited in claim 8, wherein said image acquisition device comprises one of the following: a digital camera and an imaging system coupled with a digital camera.

14. The computer program product as recited in claim 8, wherein said image acquisition device comprises one of the following: an x-ray system, a radiographic system, medical imaging modalities using ultrasound, magnetic resonance imaging and positron emission tomography.

15. An image acquisition device, comprising:
    a memory unit for storing a computer program for improving a perceptual quality and naturalness of an image captured by said image acquisition device; and
    a processor coupled to said memory unit, wherein the processor is configured to execute the program instructions of the non-transitory computer program comprising:
       detecting a scene being imaged;
       deriving statistical features of locally normalized luminance coefficients from said scene being imaged from a model of natural images with little or minimal distortion;
       measuring said statistical features from said scene being imaged;
       mapping said statistical features onto one or more control parameters of said image acquisition device; and
       modifying said one or more control parameters of said image acquisition device to maximize said perceptual quality and naturalness of said scene being imaged.

16. The image acquisition device as recited in claim 15, wherein the program instructions of the computer program further comprise:
    capturing said scene being imaged after said modification of said one or more control parameters of said image acquisition device.

17. The image acquisition device as recited in claim 15, wherein the program instructions of the computer program further comprise:
    assessing said perceptual quality and naturalness of said scene being imaged.

18. The image acquisition device as recited in claim 17, wherein the program instructions of the computer program further comprise:
    identifying a most significant distortion present in said scene being imaged in response to said assessed perceptual quality and naturalness of said scene being imaged being below a threshold; and
    modifying one or more control parameters that caused said identified most significant distortion present in said scene being imaged in response to said assessed perceptual quality and naturalness of said scene being imaged being below said threshold.

19. The image acquisition device as recited in claim 15, wherein variations in said perceptual quality and naturalness of said scene being imaged change with one of said one or more control parameters, wherein said variations are measured against a statistical natural scene model, wherein a value of said one of said one or more control parameters is modified to correspond to a best fit of said statistical features of said scene being imaged to said statistical natural scene model which corresponds to a maximum perceptual quality and naturalness of said scene being imaged.

20. The image acquisition device as recited in claim 15, wherein said image acquisition device comprises one of the following: a digital camera and an imaging system coupled with a digital camera.

21. The image acquisition device as recited in claim 15, wherein said image acquisition device comprises one of the following: an x-ray system, a radiographic system, medical imaging modalities using ultrasound, magnetic resonance imaging and positron emission tomography.

* * * * *